United States Patent [19]

Schock et al.

[11] Patent Number: 5,720,395

[45] Date of Patent: Feb. 24, 1998

[54] METHOD AND APPARATUS FOR REMOVING HULLS FROM A NUT MIXTURE

[76] Inventors: Harold J. Schock, 2170 Long Leaf Trail, Okemos, Mich. 48864-3211; Thomas R. Stuecken, 402 Wright Ct., Grand Ledge, Mich. 48837

[21] Appl. No.: 560,583

[22] Filed: Nov. 20, 1995

[51] Int. Cl.⁶ ............................................. B07C 9/00
[52] U.S. Cl. ................................. 209/700; 209/45
[58] Field of Search ............................ 209/45, 46, 606, 209/617, 618, 700, 922, 379, 381, 382, 383; 99/569

[56] References Cited

U.S. PATENT DOCUMENTS

| | | | |
|---|---|---|---|
| 1,164,953 | 12/1915 | Mewborne | 209/700 |
| 1,795,476 | 3/1931 | Coari | 99/569 X |
| 2,771,927 | 11/1956 | Thaning | 99/517 X |
| 3,326,256 | 6/1967 | Moxley et al. | 99/571 X |
| 3,401,730 | 9/1968 | Mathews et al. | 99/574 |
| 3,731,797 | 5/1973 | Tanner | 209/700 |
| 4,288,320 | 9/1981 | Wilson | 209/382 |
| 4,295,569 | 10/1981 | Niederer | 209/700 X |
| 4,504,505 | 3/1985 | Rodriguez et al. | 209/214 |
| 4,871,072 | 10/1989 | Colli | 209/700 X |
| 4,874,097 | 10/1989 | Argiriadis | 209/700 X |

FOREIGN PATENT DOCUMENTS 3017852  9/1993  WIPO ........................... 209/700

*Primary Examiner*—Tuan Nguyen
*Attorney, Agent, or Firm*—Ian C. McLeod; Mary M. Moyne

[57] ABSTRACT

An apparatus (10) and method for removing hulls (152) from a nut mixture (150) is described. The apparatus includes a gravity feed bin (12), a conveyor (28) and removal units (38). The removal units include a drum (40), a position roller (50), a beater (56) and a brush (64) around all of which extends a fibrous mat (96). The fibrous mat has looped or curved fibers (96C) and is formed as a continuous belt in the removal unit. The removal unit also includes a deflector (92) and a shield (93) to guide the removed hulls into an auger (78) to be removed from the apparatus. To operate the apparatus, the mixture is fed from the gravity feed bin onto the conveyor belt (30) of the conveyor. As the mixture moves along a horizontal path of the conveyor, the mixture comes in contact with the fibrous mat rotating in the removal units. The looped fibers of the mat contact and engage the projections (152A) on the outer surface of the hulls and secure the hulls to the mat. As the mat continues to rotate through the unit the hulls secured to the mat are removed from the mixture on the conveyor. The smooth outer surface of the meats (154) are not engaged by the looped fibers of the mat and are not picked up by the mat. As the mat moves around the unit, the beater of the unit contacts the fabric backing (96A) of the mat and acts to violently shake the mat thus, shaking off the attached hulls attached to the outer surface (96B). The removed hulls fall into the auger and are removed from the apparatus. After removal of the hulls, the mat is then fluffed by the fingers (64A) of the brush (64) in order to be ready for reuse.

30 Claims, 6 Drawing Sheets

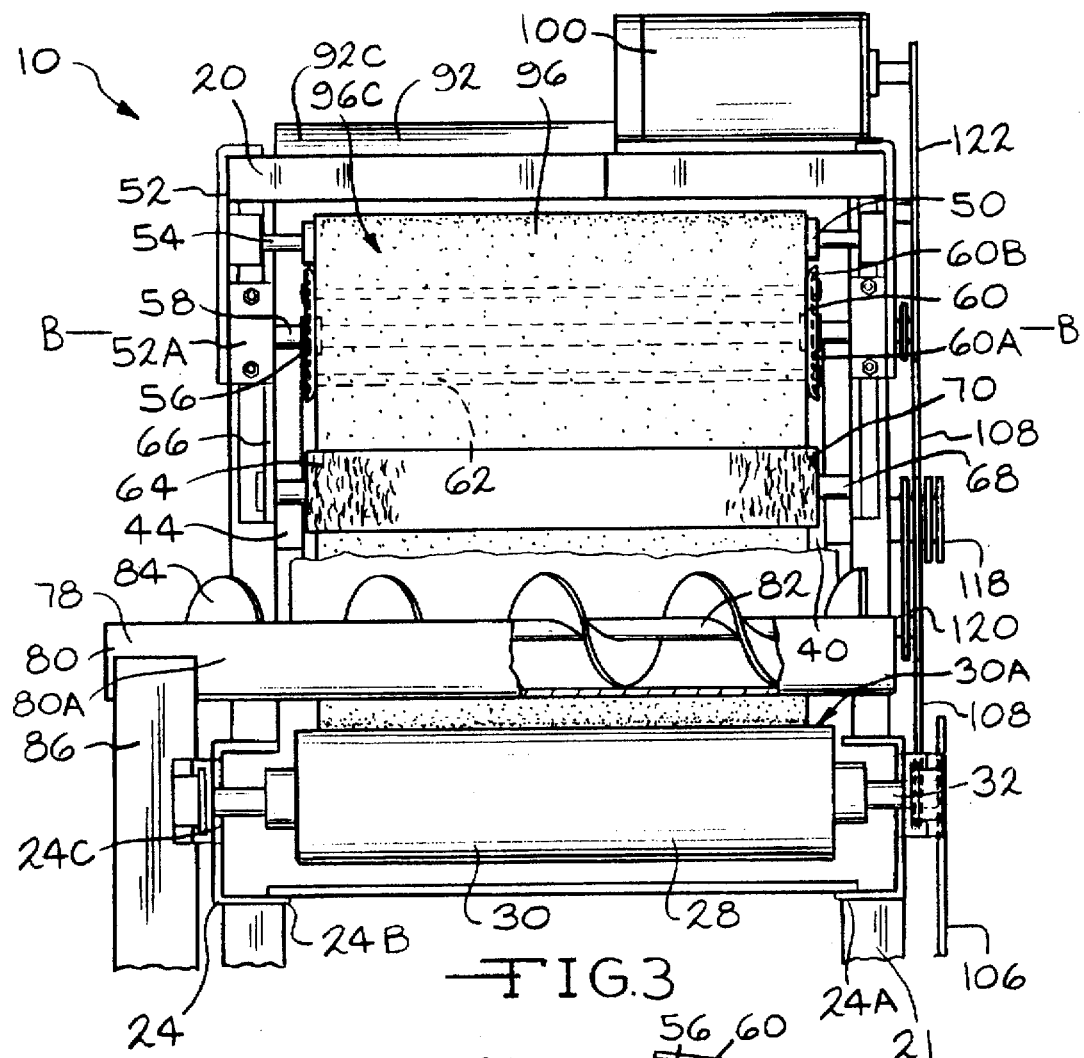
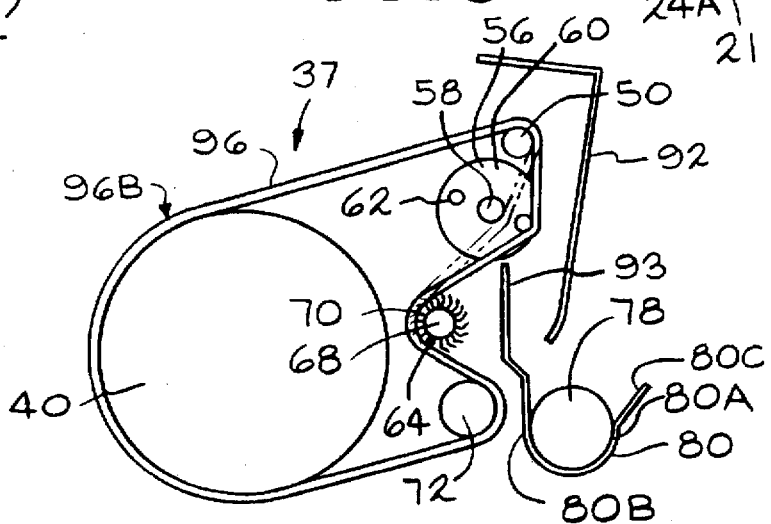
FIG. 3
FIG. 4

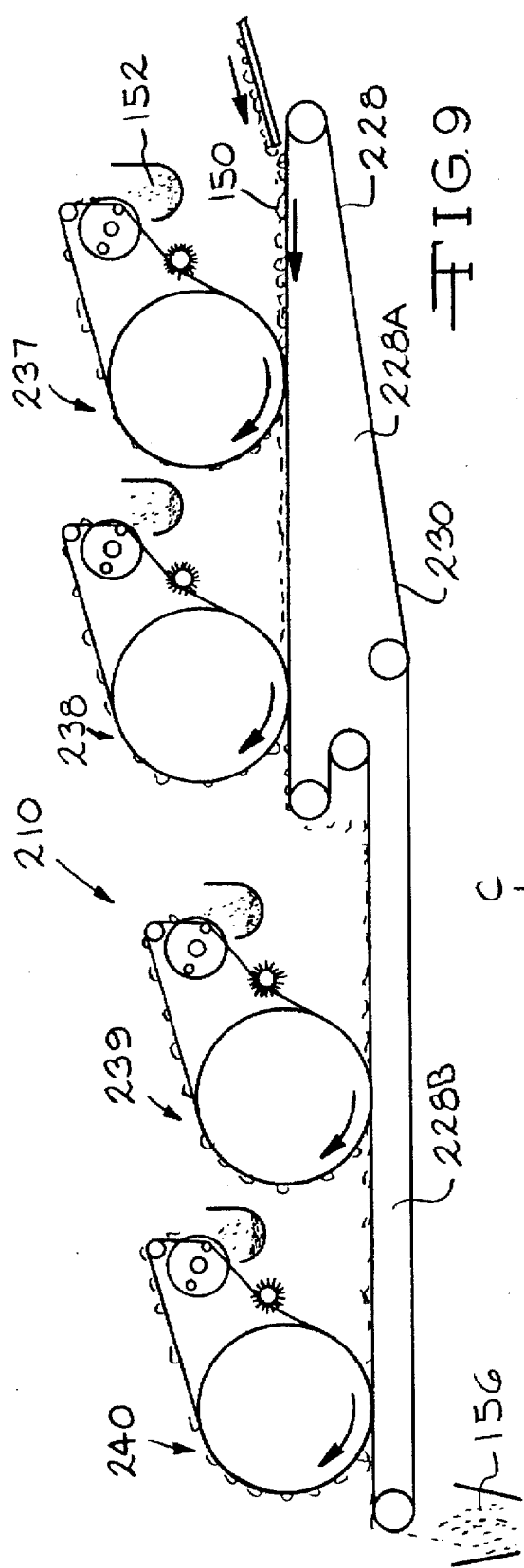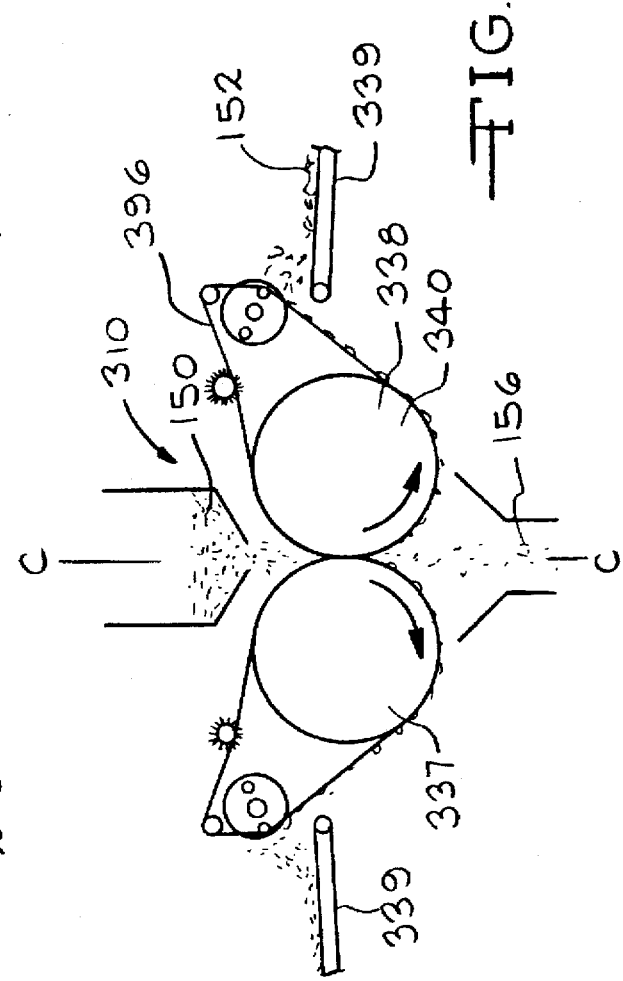

5,720,395

METHOD AND APPARATUS FOR REMOVING HULLS FROM A NUT MIXTURE

BACKGROUND OF THE INVENTION

(1) Field of the Invention

The present invention relates to a method and apparatus for removing at least some of the hulls from a mixture of hulls and meats. In particular, the present invention relates to a method and apparatus for removing at least some of the hulls from the nut mixture using a fibrous mat to engage the projections on the hulls and move the hulls engaged by the mat out of the mixture.

As a result of the processing of nuts to remove the hulls and shells of nuts to harvest the meats, a nut mixture called "nut hash" is produced. The nut mixture usually consists of between about 5% and 50% by weight meats, 50 and 95% hulls, respectively, and approximately about 5% by weight other waste materials. The nut mixture has a very low price per pound as compared to meats or mixtures containing greater than 50% meats. The reason for the low value is the inability to quickly, easily and inexpensively separate out the valuable meats from the remainder of the mixture. However, even though the nut mixture contains approximately about 10% to 20% meats, in the past, the meats were unable to be economically separated from the hulls. However, if the percentage of meats in the mixture may be easily increased to greater than 50%, then the value of the mixture is based on the going rate for meats versus the percentage of meats in the mixture. The apparatus and method of the present invention provide for the easy and efficient removal of hulls from the nut mixture.

(2) Description of the Related Art

The related art has shown various methods and apparatuses for removing hulls from a nut mixture. Illustrative is U.S. Pat. No. 4,504,505 to Rodriguez et al which describes a method and apparatus for the magnetic removal of hulls from meats. Prior to cracking, the nuts are coated with magnetic particles using a water soluble binder. After the hulls are cracked free from the meats, the mixture of hulls and meats is exposed to a magnetic field which attracts and separates the covered hulls from the aggregate leaving behind the meats.

Also, of some interest are U.S. Pat. Nos. 2,771,927 to Thaning; 3,326,256 to Moxley and 3,401,730 to Mathews et al. Thaning shows a process for shelling nuts using an electric, high frequency field. The nuts are first soaked in a solution of salt and then refrigerated. The nuts are then passed through an electric, high frequency field where the liquid between the shell and the meat vaporizes and burns off the frozen outer shell of the nut. Moxley et al shows a process and apparatus for cleaning roasted and blanched peanuts. Mathews et al describes an apparatus and method for hulling and shelling nuts using compression and/or shearing forces.

There remains the need for a method and apparatus for removing hulls from a nut mixture which is efficient and inexpensive.

OBJECTS

Therefore, it is an object of the present invention to provide an apparatus for removing hulls from a nut mixture which quickly, easily and inexpensively removes the hulls from the mixture. Further, it is an object of the present invention to provide a method of removing hulls from a nut mixture which is quick, easy and inexpensive. Still further, it is an object of the present invention to provide an apparatus which uses a fibrous mat to engage projections on the outer surface of the hull in order to secure the hull on the mat for removal from the nut mixture. Further, it is an object of the present invention to provide a method for removing hulls from a nut mixture which relies on the different textures of the outer surfaces of the hulls and the meats to remove the hulls and leave the meats. Further still, it is an object of the present invention to provide an apparatus which uses a fibrous mat in the form of a rotating belt along with a conveyor belt for supporting the mixture to remove the hulls from the mixture.

These and other objects will become increasingly apparent by reference to the following drawings and the description.

BRIEF DESCRIPTION OF THE DRAWINGS

FIG. 3 is a front view of the apparatus 10 without the gravity feed bin 12 and the deflector 92 and having a cutout portion showing the auger 78 and showing the beater 56 in hidden lines behind the mat 96 and showing the brush 64.

FIG. 4 is a left side schematic view of the removal unit 37 showing the drum 40, the beater 56, the brush 64, the tension roller 72 all surrounded by the fibrous mat 96 and also showing the auger 78.

FIG. 9 is a schematic view of a second embodiment of the apparatus 210 showing the four removal units 237, 238, 239 and 240 and the bi-level conveyor 228 with the drop off between the first pair and the second pair of removal units 237, 238, 239 and 240.

FIG. 10 is a schematic view of a third embodiment of the apparatus 310 showing the two opposed vertical removal units 337 and 338.

DETAILED DESCRIPTION OF THE PREFERRED EMBODIMENTS

Figure 1:
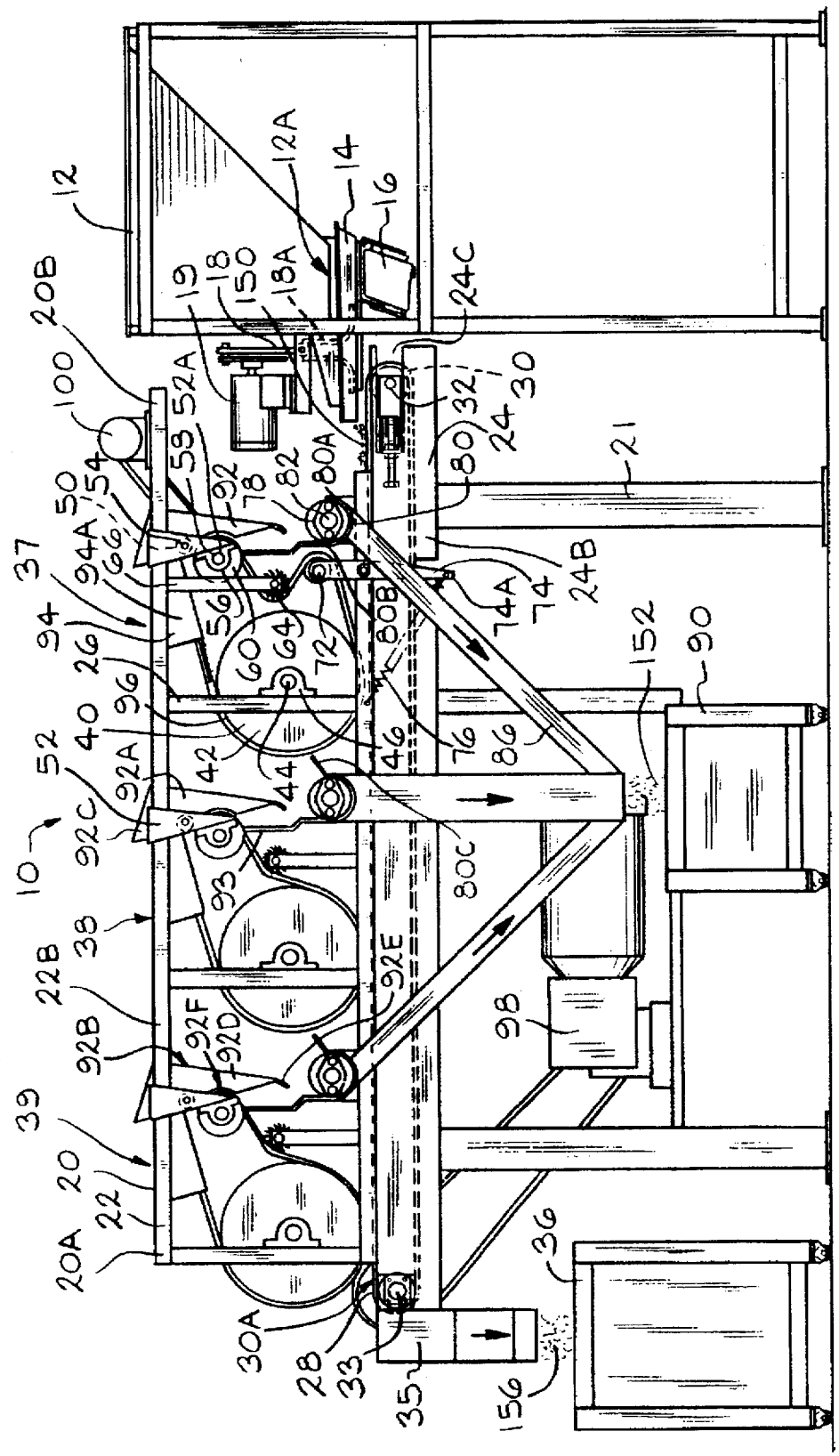
FIG. 1 is a left side view of the apparatus 10 showing the gravity feed bin 12, the conveyor 28 and the removal units 37, 38 and 39.

The present invention relates to an apparatus for the removal of at least some pieces of broken outer layers from a mixture of meats and pieces of the outer layers wherein in the mixture, the pieces of outer layers are separated from the meats and have fibrous projections extending from the pieces of the outer layers, which comprises: support means having a surface for supporting the mixture of the pieces of outer layers and the meats; removal means supporting a fibrous mat, wherein the surface of the support means and the fibrous mat of the removal means are movable into closely spaced relationship so that the fibrous projections on the broken pieces of the outer layers engage the fibrous mat which is movable so that the pieces of the outer layers engaged on the fibrous mat are separated from the meats which remain on the surface of the support means; and actuating means for moving at least one of the support means or the removal means for removal of the broken pieces of the outer layers on the fibrous mat from the meats on the surface of the support means.

Further, the present invention relates to a method for removal of pieces of outer layers from a mixture of meats and pieces of the outer layers, wherein in the mixture, the pieces of the outer layers are separated from the meats and have fibrous projections extending from the pieces of the outer layers, which comprises: feeding the mixture to an apparatus which comprises: support means having a surface for supporting the mixture of the pieces of the outer layers and the meats; removal means supporting a fibrous mat, wherein the surface of the support means and the fibrous mat of the removal means are movable into closely spaced relationship so that the fibrous projections on the broken pieces of the outer layers engage the fibrous mat which is movable so that the pieces of the outer layers engaged on the fibrous mat are separated from the meats which remain on the surface of the support means; and separating at least some of the pieces of the outer layers from the meats on the fibrous mat by providing the fibrous mat in and out of contact with the mixture.

The nut mixture is fed from a bin onto a conveyor belt. Fingers adjacent the outlet of the bin act to spread the mixture evenly across the conveyor belt to provide a single layer of mixture on the belt. The drums of the removal units are mounted on a frame in a horizontal plane above the conveyor. The removal units are provided with a brush for contacting the mat after removal of the hulls for rejuvenating the mat. Preferably, the fibrous mat is in the form of a belt supported by the drum and idler rollers and is constructed of shearling. The removal units are preferably provided with a beater which rotates against the fibrous mat to beat the hulls of the mat. The hulls which are removed fall into an auger and are moved into a chute which feeds into a container.

In general, a nut is a dry, hard-shelled fruit with a firm inner kernel. The kernel or meat of the nut or fruit is the inner, usually edible, seed of the fruit or nut. The bony, outer layer of the fruit or nut is the pericarp or shell. The outermost covering of the fruit or nut is known as the epicarp or hull. The processing of nuts removes the outer layers, the shell and the hull, from around the meat. The contents of the nut mixture after conventional separation methods, such as gravity separation have been used, depends upon the density and weight of each of the parts of the nut. Those parts of the nut having similar weight and density as the meats will remain in the mixture. In almond processing, the hulls and the meats have approximately the same weight and density. Therefore, with almonds the mixture contains hulls, meats and other waste products. However, with other nuts, the mixture could contain shells and/or hulls. In the preferred embodiment, the hulls 152 of the nuts have fibrous extensions or projections 152A similar to hair on their outer surface. In contrast, the meats 154 in the preferred embodiment, have a smooth outer surface. The dissimilarity of the outer surfaces of the hulls and meats enable the apparatus 10 to operate effectively. The apparatus 10 will work with other nut mixtures containing shells and/or hulls provided that only the shells and/or hulls have fibrous projections or alternatively, the meats only have projections. In addition, the apparatus 10 will also remove any of the waste materials in the mixture which have projections.

Figure 2:
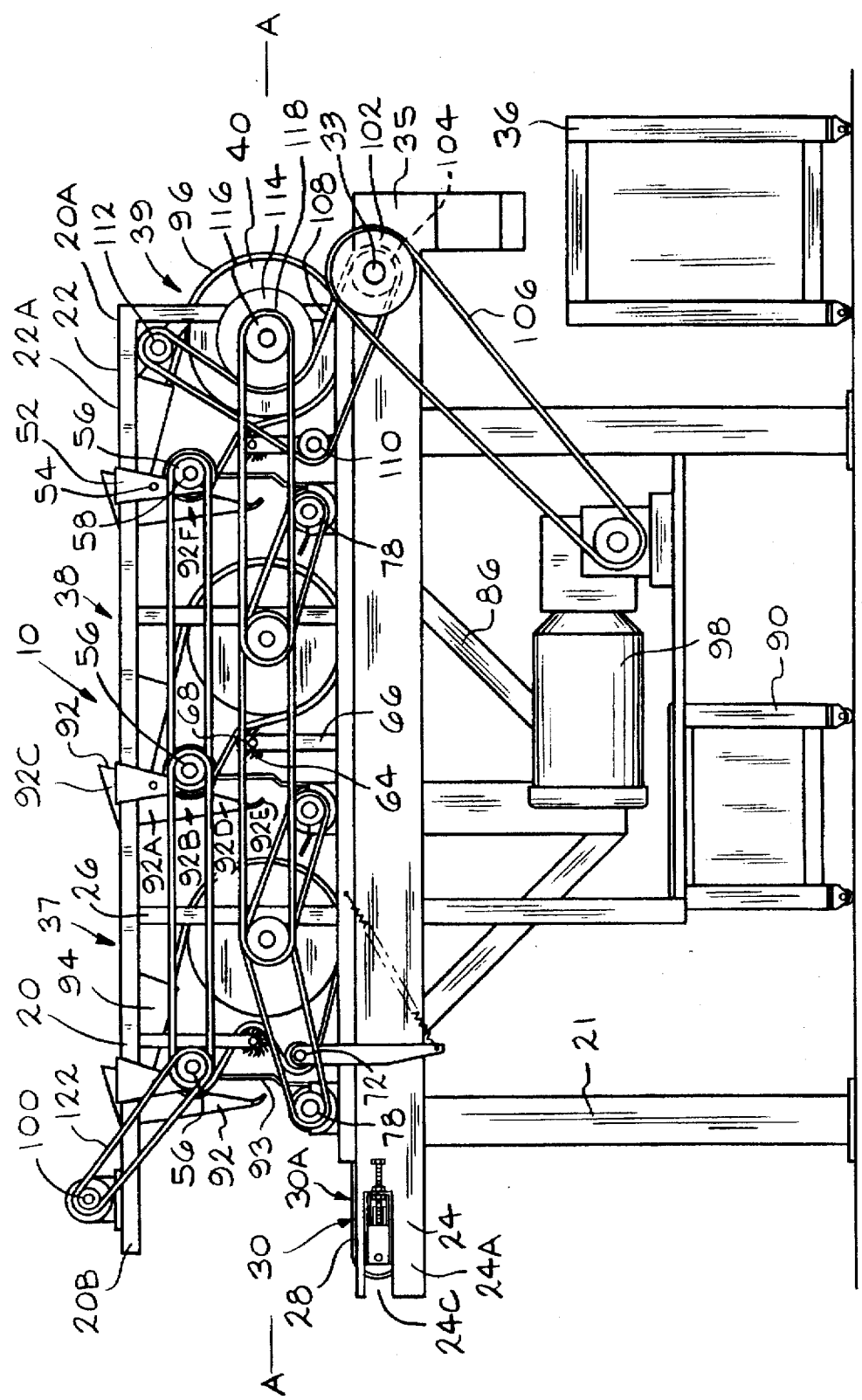
FIG. 2 is a right side view of the apparatus 10 without the gravity feed bin 12 showing the drive motor 98 connected to the conveyor 28 which is connected to the drums 40 of the removal units 37, 38 and 39 which are connected to the augers 78 and also showing the beater motor 100 connected to the beaters 56.
Figure 5:
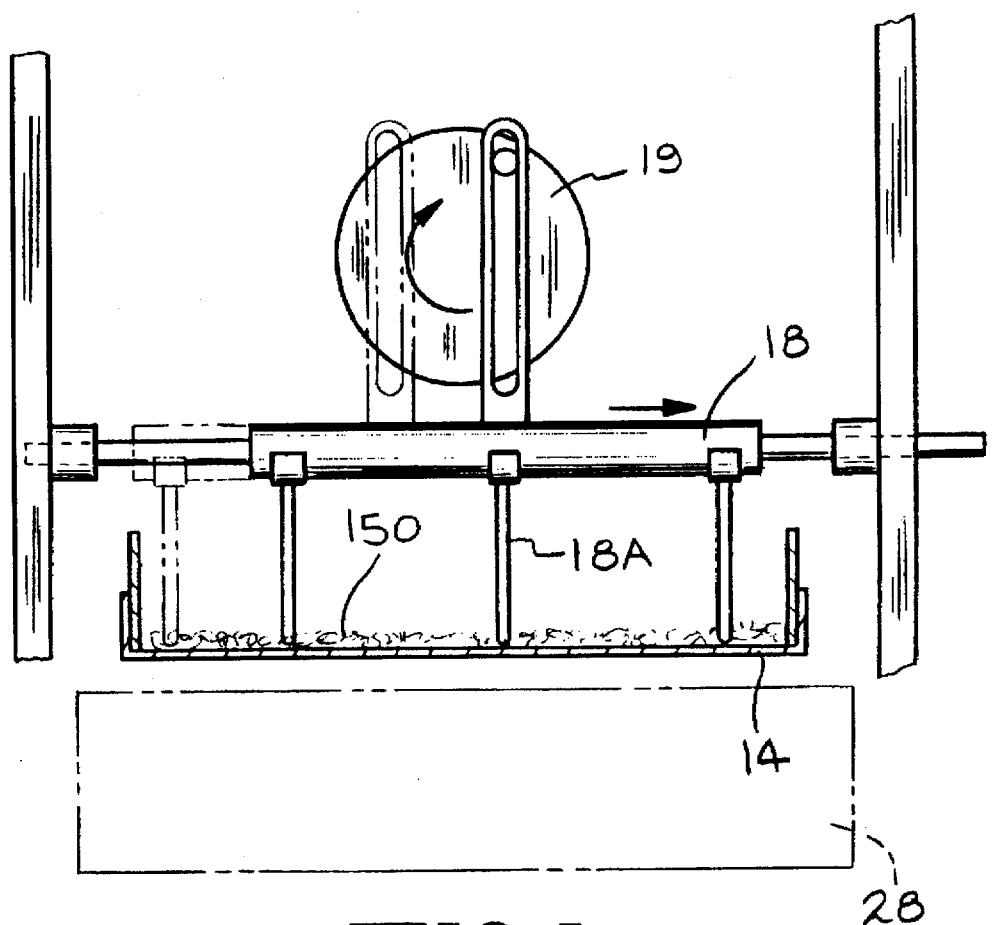
FIG. 5 is a cross-sectional front view taken in front of the gravity feed bin 12 showing the separating fingers 18A of the agitator 18.

FIGS. 1 and 2 show the hull removing apparatus 10 of the present invention. The hull removing apparatus 10 includes a gravity feed bin 12, a conveyor 28 and removal units 37, 38 and 39. The gravity feed bin 12 is preferably funnel-shaped with an opening 12A at the bottom of the bin 12 for feeding the nut mixture 150. A plate 14 is spaced beneath the opening 12A and is provided with a vibrator motor 16 which vibrates the plate 14 in an up, forward and back motion in order to advance the nut mixture 150 out of the bin 12 and onto the conveyor 28 (to be described in detail hereinafter). The vibration of the plate 14 also helps to distribute the nut mixture 150 along the entire width of the plate 14 and subsequently, along the width of the conveyor belt 30. The feed bin 12 is preferably similar to the vibratory hopper feeder sold by B.E.S.T located in Cleveland, Ohio. To further assist in evenly spreading the nut mixture 150 on the plate 14 and onto the conveyor belt 30, an agitator 18 having separating fingers 18A is mounted in front of the feed bin 12 over the vibrating plate 14 (FIG. 5). The agitator 18 is mounted such that the fingers 18A of the agitator 18 extend downward to a point slightly above the top of the plate 14. The fingers 18A are moved back and forth in a linear motion parallel to the feed bin 12 along the top of the plate 14 by an agitator motor 19. The agitator motor 19 is preferably a gear reduction motor. The fingers 18A act to knock down the nut mixture 150 as it tends to bridge so as to separate the mixture 150 as the mixture 150 exits the feed bin 12 onto the plate 14 and before the mixture 150 drops onto the conveyor belt 30. Although the gravity feed bin 12 is preferred for feeding the mixture 150 onto the conveyor 28, it is understood that a variety of other mechanisms might also be used.

The apparatus 10 includes a frame 20 on which the conveyor 28, the removal units 37, 38 and 39 and the removal chutes 86 are mounted. The frame 20 has spaced apart and parallel top and bottom sections 22 and 24. The top section 22 includes a right and left top frame member 22A and 22B. Likewise, the bottom section 24 includes a right and left bottom frame member 24A and 24B. The bottom section 24 is preferably mounted on legs or a base 21 such as to position the apparatus 10 above the ground surface. The top and bottom sections 22 and 24 of the frame 20 extend parallel to each other and parallel to the longitudinal axis A—A of the apparatus 10. The top and bottom sections 22 and 24 of the frame 20 are connected together by several vertical side frame members 26 which also act to mount the drums 40 of the removal units 37, 38 and 39 (to be described in detail hereinafter) between the top and bottom sections 22 and 24 of the frame 20. The bottom frame members 24A and 24B are preferably longer than the top frame members 22A and 22B in order to accommodate the conveyor 28.

Figure 7:
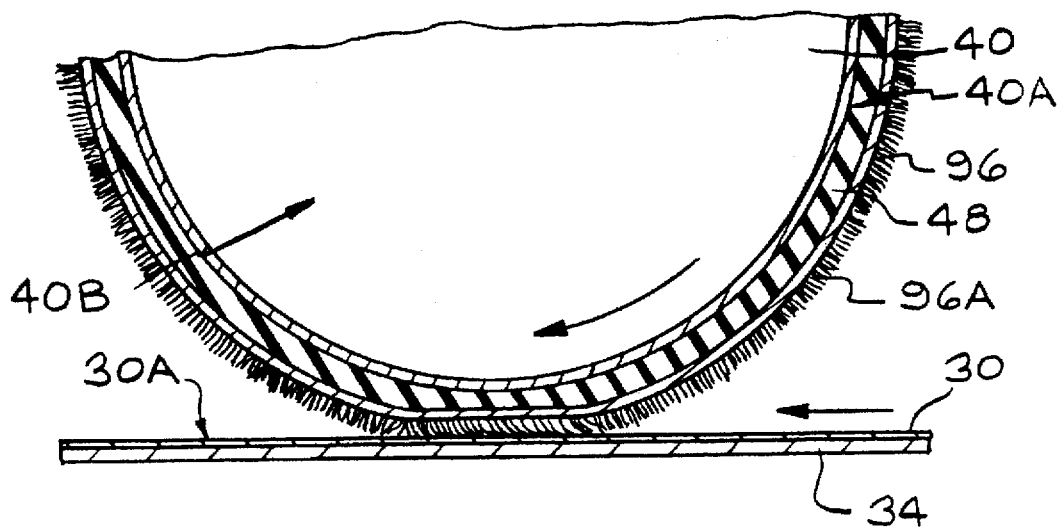
FIG. 7 is a partial cross-sectional side view of the fibrous mat 96 on the drum 40 in contact with the conveyor belt 30.
Figure 8:
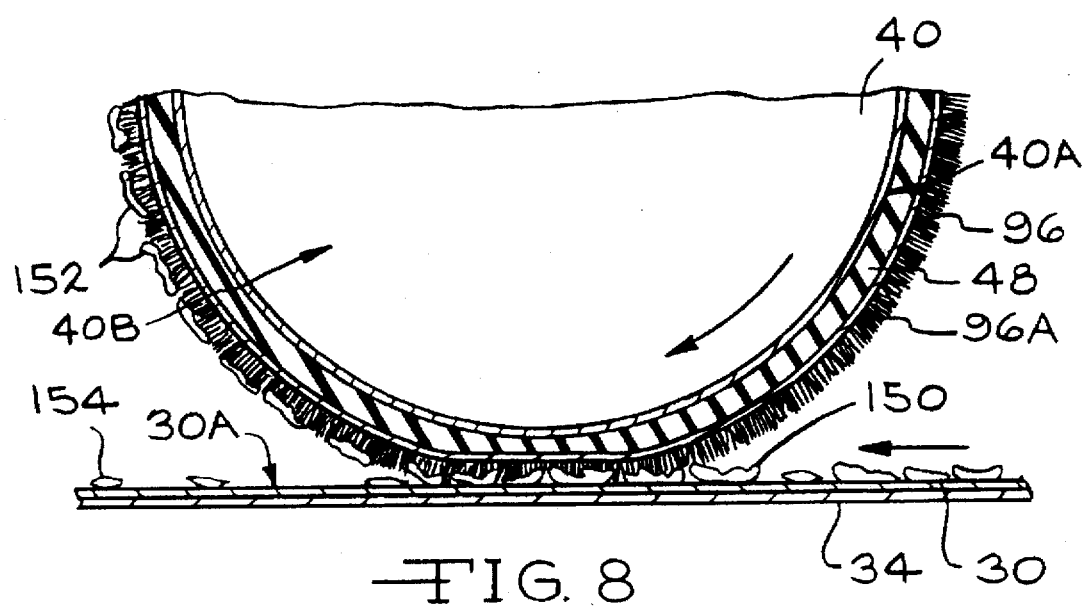
FIG. 8 is a partial cross-sectional side view of the fibrous mat 96 on the drum 40 in contact on the conveyor belt 30 with the mixture 150 therebetween.

The conveyor 28 is preferably mounted between the right and left bottom frame members 24A and 24B of the bottom section 24 of the frame 20 (FIG. 1). The conveyor 28 extends along the length of the apparatus 10 parallel to the longitudinal axis A—A of the apparatus 10. The conveyor 28 includes a conveyor belt 30 which extends between front and back rollers 32 and 33 mounted at the front and back end 20A and 20B, respectively, of the frame 20 on the bottom section 24 of the frame 20. The back roller 33, mounted at the back end 20A of the frame 20, is preferably connected by a first chain 106 to the drive motor 98 (to be described in detail hereinafter) (FIG. 2). The front roller 32 is preferably mounted such as to freely rotate in response to the motion of the conveyor belt 30. The front roller 32 is preferably mounted in slots 24C in the right and left bottom frame members 24A and 24B of the frame 20. The slots 24C allow the distance between the front roller 32 and the back roller 33 to be varied in order to tension the conveyor belt 30 to accommodate any stretching by the conveyor belt 30 over time. In the preferred embodiment, the rollers 32 and 33 are spaced 84 inches (213 cm) apart such that the upper portion 30A of the conveyor belt 30 is 84 inches (213 cm) in length. The conveyor belt 30 preferably has a width slightly greater than the width of the mat 96 and is preferably constructed of rubber with an inner metal support structure. A support plate 34 is mounted between the rollers 32 and 33 beneath the upper portion 30A of the conveyor belt 30 (FIGS. 7 and 8). The support plate 34 prevents the conveyor belt 30 from flexing downward as a result of pressure from the drums 40 of the removal units 38. In the preferred embodiment, the support plate 34 is constructed of steel. The back end 20A of the frame 20 adjacent the back roller 33 of the conveyor 28 is preferably provided with a collection bin 36 which collects the final nut mixture 156 which has been passed through the apparatus 10. A collection funnel 35 mounted on the bottom section 24 of the frame 20 adjacent the back roller 33 of the conveyor 28 guides the final mixture 156 into the collection bin 36.

As shown in FIGS. 1 and 2, there are preferably three (3) removal units 37, 38 and 39 along the length of the frame 20. Each removal unit 37, 38 and 39 is preferably similar and therefore, only the front most removal unit 37 will be described in detail. The removal unit 37 includes a drum 40, a position roller 50, a beater 56 and a brush 64 around all of which extends the fibrous mat 96 (FIG. 4). The removal unit 37 also has a deflector 92, a shield 93 and an auger 78 to carry away the removed hulls 152. The drum 40 is preferably cylindrical in shape with an outer surface 40A around the circumference surrounding a hollow interior 40B (FIGS. 7 and 8). The hollow interior 40B makes the drum 40 lighter and easier to manufacture. End caps 42 are positioned at each end of the drum 40 and are attached around the circumference to the outer surface 40A of the drum 40 (FIGS. 1 and 2). The end caps 42 have a hole (not shown) in their center through which is mounted an axle 44. The end caps 42 preferably act to keep the axle 44 in a fixed position within the drum 40 to allow the drum 40 to rotate with the axle 44. The axle 44 is preferably positioned in the center of the drum 40 forming the axis of rotation B—B of the drum 40 (FIG. 3). The axle 44 extends beyond the end caps 42 of the drum 40 and is rotatably mounted in brackets 46 on one pair of the vertical frame members 26 of the frame 20. The axle 44 is mounted such as to extend between the top and bottom left and right frame members 22B, 24B, 22A and 24A of the frame 20 parallel to the conveyor 28. The drum 40 preferably has an outer diameter of 13.0 inches (33 cm) without the cushion layer 48 and a length of 18.0 inches (45.7 cm). The outer diameter of the drum 40 preferably varies in size depending upon the mixture 150. The larger the radius of the drum 40, the faster the drum 40 is able to be rotated and still operate effectively. The outer surface 40A of the drum 40 is preferably covered with a cushion layer 48 (FIGS. 7 and 8). The cushion layer 48 preferably extends around the entire outer surface 40A of the drum 40. The cushion layer 48 is secured onto the outer surface 40A of the drum 40 such as to rotate with the drum 40. The cushion layer 48 is preferably 0.75 to 1.00 inches thick (1.91 to 2.54 cm) and is made of sponge rubber.

In the preferred embodiment, the drum 40 is mounted above the conveyor 28 such that the mat 96 on the drum 40 is in contact with the conveyor belt 30 and under such loading force (approximately about 180 lbs/ over 18 inches of drum length) that the contact between the drum 40 and the conveyor 28 deforms the cushion layer 48 on the drum 40 (FIG. 7). The loading force will necessarily depend upon the size of the drum 40. The cushion layer 48 deforms due to the support plate 34 beneath the conveyor belt 30 which does not allow the conveyor belt 30 to flex downward. The cushion layer 48 prevents the drum 40 from damaging the meats 154 of the mixture 150.

A position roller 50 spaced above and in front of the drum 40 is mounted by its shaft 54 to a bracket 52 adjacent the top section 22 of the frame 20. The rollers 50 extend between the top right and left frame members 22A and 22B of the frame 20 parallel to the drum 40. The position roller 50 is mounted in the bracket 52 such as to freely rotate around the shaft 54 in response to the movement of the fibrous mat 96 over the outer surface of the roller 50. Preferably, the beater 56 is mounted to an extension 52A of the same bracket 52 as the position roller 50. The beater 56 is positioned closer to the drum 40 than the position roller 50 and is also spaced further from the top section 22 of the frame 20 than the position roller 50. The beater 56 preferably has a central shaft 58 with an end plate 60 at each end adjacent the bracket 52. Two beater rods 62 are mounted between the plates 60 spaced 180° apart and extend parallel to the central shaft 58 of the beater 56 (FIG. 3). The rods 62 preferably have a circular cross-section although other shapes could also be used. The end plates 60 preferably have a circular inner disc 60A with a flange 60B extending outward from the disc 60A around the perimeter of the disc 60A. The flanges 60B are angled such as to curve away from the interior of the apparatus 10 such as to act as a guide for the fibrous mat 96 to center the mat 96 on the beater 56. The brush 64 is mounted by a bracket 66 mounted on the top section 22 of the frame 20. The bracket 66 extends downward from the top section 22 parallel to the vertical side members 26 of the frame 20. However, if the removal unit 37 is not provided with a tension roller 72 (to be described in detail hereinafter) the bracket 66 may be mounted on the bottom section 24 of the frame 20 and extend upward. The brush 64 is mounted so as to be closer to the drum 40 and the bottom frame members 24A and 24B than the beater 56. The brush 64 has a central shaft 68 from which extends a plurality of bent wires 70. The wires 70 are preferably bent in the direction of movement of the fibrous mat 96 such that the ends of the wires 70 contact the fibers 96C of the fibrous mat 96 and act to fluff or lightly pull on the fibers 96C such as to fluff the fibers 96C on the fibrous mat 96. The brush 64 is mounted such as to freely rotate in response to the movement of the fibrous mat 96 over the wires 70. The wires 70 are preferably about 0.50 inches (1.27 cm) in length and are bent about half way at approximately about a 10° to 15° angle. The wires 70 are preferably flexible such as to move when hooked by the fibers 96C of the mat 96. The brush 64 is preferably similar to the high knee stripper sold by Belton Bros. located in York, S.C.

The removal unit 37 may also be provided with a tension roller 72 mounted to a lever arm 74 which is pivotably mounted to the bottom frame members 24A and 24B beneath the brush 64. The lever arm 74 extends from the tension roller 72 past the pivot point on the bottom frame members 24A and 24B such that the bottom end 74A of the lever arm 74 extends below the bottom frame members 24A and 24B. The tension roller 72 is able to be adjusted and set in a variety of positions toward and away from the drum 40. The tension roller 72 is used to provide uniform tension on the fibrous mat 96 such as to compensate for any stretching of the mat 96 during use. In the preferred embodiment, the bottom end 74A of the arm 74 is connected by a spring 76 to the bottom frame member 24A or 24B. The tension of the spring 76 is such as to move the tension roller 72 such as to keep the mat 96 at a constant tension.

The auger 78 for catching the removed hulls 152 and moving the removed hulls 152 out of the apparatus 10 is mounted in a trough 80 adjacent to and spaced between the bottom right and left frame members 24A and 24B which extends parallel to the drum 40. The auger 78 is comprised of a shaft 82 having screw-like fins 84 (FIG. 3). The auger 78 is mounted such that the shaft 82 of the auger 78 is in front of the shaft 54 of the position roller 50 and the shaft 58 of the beater 56. The trough 80 is preferably U-shaped with a front leg 80A and a back leg 80B with the auger 78 positioned between the legs 80A and 80B. The trough 80 is positioned such that the back leg 80B of the trough 80 is spaced beneath the beater 56. In addition, where the removal unit 38 or 39 is adjacent another removal unit 37 or 38, the auger 78 of the one removal unit 38 or 39 is preferably positioned such that the front leg 80A of the trough 80 is adjacent the fibrous mat 96 of the adjacent removal unit 37 or 38. The front leg 80A of the trough 80 is provided with an extended lip 80C which extends outward away from the auger 78 towards the drum 40 of the adjacent unit 37 or 38. The close proximity of the extended lip 80C of the trough 80 to the mat 96 enables the trough 80 to collect hulls 152 which are only slightly engaged by the adjacent mat 96 and which fall off the mat 96 almost immediately upon being lifted off the conveyor 28. Thus, the position of the trough 80 enables the trough 80 to collect hulls 152 from two adjacent removal units 37, 38 or 39. The end of the auger 78 adjacent the bottom left frame member 24B of the frame 20 preferably extends outward beyond the left side of the apparatus 10 and is connected by an opening (not shown) in the bottom of the trough 80 to a removal chute 86 which connects to a removal bin 90.

The removal unit 37 is provided with a deflector 92 which is mounted on and between the top right and left frame members 22A and 22B of the frame 20. The deflector 92 is mounted in front of the position roller 50 and the beaters 56, away from the drum 40. The deflector 92 is preferably U-shaped having two sidewalls 92A and a flat middle section 92B. The deflector 92 has an angled top portion 92C which angles slightly upward and outward away from the top section 22 of the frame 20. The top portion 92C extends over the position roller 50 and thus, over the mat 96 mounted on the roller 50. The top portion 92C is spaced above the top frame members 22A and 22B such as to not interfere with the movement of the mat 96 over the roller 50. The bottom portion 92D of the deflector 92 extends downward beyond the beater 56 and stops slightly above the auger 78. The sidewalls 92A of the bottom portion 92D preferably have an indentation 92F which allows for mounting the deflector 92 adjacent the end plates 60 of the beater 56. An extension 92E is mounted on the extreme bottom portion 92D of the deflector 92 adjacent the auger 78 and is angled inward toward the drum 40. A shield 93 is mounted on the back leg 80B of the trough 80 and extends upward from the trough 80 toward the beater 56. Preferably, the shield 93 is angled outward such as to extend away from the brush 64 over the trough 80 of the auger 78 and such as to vertically overlap the extension 92E of the deflector 92. In the preferred embodiment, the shield 93 and the extension 92E of the deflector 92 are angled similarly such that the deflector 92 and the shield 93 extend parallel to each other. The corridor provided between the deflector 92 and the shield 93 help to guide the removed hulls 152 into the auger 78. The deflector 92 prevents the removed hulls 152 from falling outward beyond the front leg 80A of the trough 80 while the shield 93 prevents the removed hulls 152 from falling inward behind the rear leg 80B of the trough 80.

A guide 94 is mounted on and between the top right and left frame members 22A and 22B of the frame 20. The guide 94 preferably has a floor (not shown) with two triangular shaped sidewalls 94A extending upward from the floor. The sidewalls 94A preferably have a hook (not shown) at the end opposite the floor 94A which allows the guide 94 to be attached over the top frame members 22A and 22B of the frame 20. The guide 94 is mounted such that the sidewalls 94A extend downward from the top frame members 22A and 22B to the floor which is mounted at an angle such as to extend from a point spaced above the drum 40 to a point slightly above and not quite in line with the position roller 50. The guide 94 provides support for the mat 96 in the space between contact with the drum 40 and contact with the roller 50. The sidewalls 94A of the guide 94 ensure that the mat 96 remains correctly positioned and centered in the removal unit.

Figure 6:
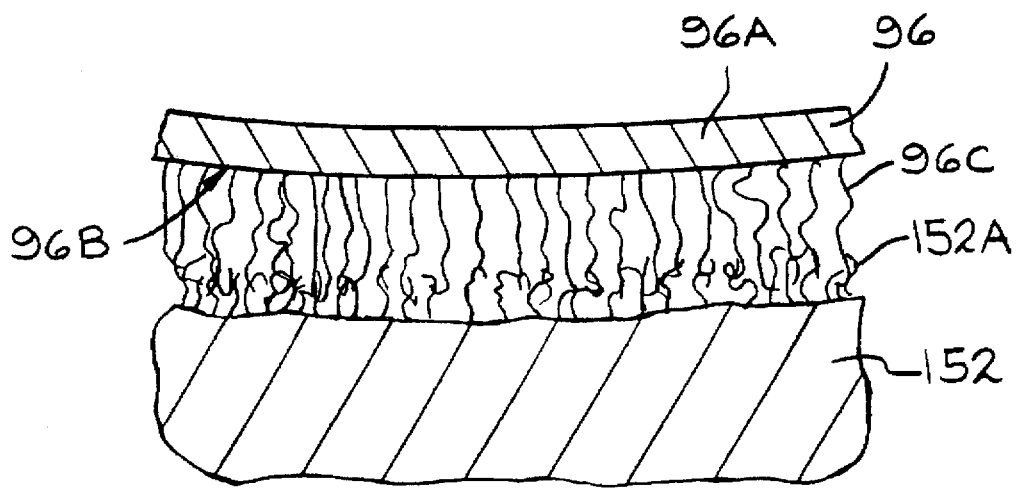
FIG. 6 is an enlarged partial view showing the fibers 96C of the fibrous mat 96 engaging the projections 152A of the hull 152.

The fibrous mat 96 is mounted on the drum 40 and around the various components of the removal unit 37. The mat 96 preferably has a fabric backing 96A with an outer surface 96B containing looped or curved fibers 96C (FIG. 6). The mat 96 is preferably flexible such as to be able to be positioned around the components of the removal unit 37. The mat 96 is preferably in the form of a continuous chain which extends around the removal unit 37. The mat 96 preferably extends over the floor of the guide 94 and around and over the top of the position roller 50 and down adjacent to the beater 56 such that the beater 56 makes contact with the fabric backing 96A of the mat 96. The mat 96 then extends around the beater 56 and over the top of the brush 64 such that the outer surface 96B of the mat 96 is adjacent and in contact with the wires 70 of the brush 64. Further, if a tension roller 72 is used, the mat 96 then extends around and beneath the brush 64 and over the top and around the tension roller 72 such that the tension roller 72 is adjacent the fabric backing 96A of the mat 96. The mat 96 must be durable such as to be able to withstand continuous rotation in the removal unit 37, especially being beaten by the beaters 56. Further, the outer surface 96B must be able to engage the extensions 152A of the hulls 152 and hold the hulls 152 until they are removed from the nut mixture 150 (FIG. 6). The outer surface 96B must also be able to be used continuously. The brushes 64 assist in keeping the outer surface 96B of the mat 96 in a useful condition. In the preferred embodiment, the mat 96 is operated for approximately about 8.0 hours before needing replacement. It may also be possible to rejuvenate the mat 96 for reuse such as by washing. The mat 96 preferably has a total length of 68.0 inches (173 cm) and is about 18.0 inches (45.7 cm) across. The mat 96 preferably has a total uncrushed thickness of about 0.75 inches (1.91 cm) with the fabric backing 96A being approximately about 0.031 inches (0.079 cm) thick and the fibers 96C extending about 0.75 inches (1.91 cm) upward from the backing 96A. Preferably, the fabric backing 96A of the mat 96 is constructed of 100% polypropylene and the outer surface 96B with the fibers 96C is constructed of 85% polyester and 15% acrylic, similar to shearling sold by Borg Textiles located in Rossville, Ga. Other materials such as thick fibrous felt, automotive carpet and other types of carpet may also be used.

The apparatus 10 is preferably driven by a drive motor 98 and a beater motor 100. The beater motor 100 drives the beaters 56 of the apparatus 10 while the drive motor 98 drives the remainder of the components of the removal unit 37 and also drives the conveyor 28. In addition, the gravity feed bin 12 is provided with a vibrator motor 16 to vibrate the plate 14 and an agitator motor 19 to move the fingers 18A of the agitator 18 in order to distribute the nut mixture 150. The back roller 33 of the conveyor 28 is preferably provided with an outer and inner gear 102 and 104 adjacent the right bottom frame member 24A (FIG. 2). The gears 102 and 104 are preferably mounted on the outside of the frame 20 such that the inner gear 104 is spaced between the outer gear 102 and the right bottom frame member 24A. The outer gear 102 is preferably connected to the drive motor 98 by a first chain 106. The drive motor 98 rotates the outer gear 102 and consequently the back roller 33 of the conveyor 28 in a direction such as to move the conveyor belt 30 through the apparatus 10 from the front of the apparatus 10 to the back of the apparatus 10. The inner gear 104 is preferably provided with a second chain 108 which extends upward around a first idle gear 110 mounted on the bracket 52 which holds the brush 64 of the rearmost removal unit 39 and then further upward around a second idle gear 112 mounted above the drum 40 of the rear most removal unit 39. The second chain 108 is looped around the first and second idle gears 110 and 112 such that one side of the chain 108 is in contact with a large gear 114 mounted on the axle 44 of the drum 40 of the removal unit 39. The positioning of the idle gears 110 and 112 and the second chain 108 enables the drum 40 to be rotated in a direction opposite the conveyor 28 using the same drive motor 98. The axle 44 of the drum 40 has a smaller outer gear 116 which is connected by a third chain 118 to the drum 40 of the next adjacent, middle removal unit 38. Likewise, the second drum 40 is connected by a chain to the third drum 40. Thus, the drums 40 of all the removal units 37, 38 and 39 rotate the same. The auger 78 of the rearmost removal unit 39 is connected by a fourth chain 120 to the drum 40 of the adjacent removal unit 38. In the preferred embodiment, the drum 40 of the front most removal unit 37 is connected to both the auger 78 of the middle removal unit 38 and its own auger 78. This double connection is necessitated by the existence of the second chain 108 around the drum 40 in the rearmost removal unit 39. The beaters 56 are preferably driven by a beater motor 100 which is mounted on top of the top right frame member 22A. The motor 100 is preferably connected by a fifth chain 122 to the auger 78 of the frontmost removal unit 37. Preferably, all of the beaters 56 are connected together such as to rotate similarly.

The drive motor 98 rotating the conveyor 28, the drum 40 and augers 78 of the removal speed units 37, 38 and 39 is preferably a 3 HP motor driving a 28 RPM speed reducer. The beater motor 100 for driving the beaters 56 is preferably a standard ½ HP D.C. variable speed motor. In the preferred embodiment, the drums 40 and the conveyor 28 move at the same speed but rotate in opposite directions such that at the point of contact between the conveyor belt 30 and the drum 40, the drum 40 and the belt 30 appear to be moving in the same direction.

In a second embodiment as shown in FIG. 9, the apparatus 210 is provided with four removal units 237, 238, 239 and 240 which are positioned together in two pairs. The removal units 237, 238, 239 and 240 have the same components and operate similarly to the removal units 37, 38, and 39 of the preferred embodiment. The second embodiment is also provided with a bi-level conveyor 228. The first pair of removal units 237 and 238 is positioned along the upper level 238A of the conveyor 228. The second pair of removal units 239 and 240 is positioned along the lower level 238B of the conveyor 228. The conveyor 228 is preferably provided with one continuous belt 230 for both levels.

In a third embodiment as shown in FIG. 10, the apparatus 310 has two removal units 337 and 338 positioned such that the drums 340 of the units 337 and 338 are adjacent each other about a vertical axis C—C. Contact between the fibrous mats 396 and the nut mixture 150 is along the vertical axis C—C instead of a horizontal axis as in the preferred and second embodiments of the apparatus 10 and 210. The drums 340 rotate in opposite directions such that at the point of contact between the drums 340, the nut mixture 150 sees the drums 340 rotating in the same direction. The brushes 364 of the units 337 and 338 are also positioned differently in the third embodiment due to the different orientation of the drums 340.

IN USE

In the preferred embodiment, the nut mixture 150 is first fed into the top of the gravity feed bin 12. The nut mixture 150 exits the bin 12 onto the plate 14 which moves the nut mixture 150 forward onto the conveyor belt 30. As the nut mixture 150 is exiting the bin 12, the fingers 18A of the agitator 18 levels out the nut mixture 150 and keeps the nut mixture 150 from bridging up. The vibration of the plate 14 also helps to level out the nut mixture 150. For the best results, it is important that the nut mixture 150 is fed onto the conveyor belt 30 in a single depth and across the entire width of the belt 30. Spreading the nut mixture 150 out exposes a greater amount of the surface area of the nut mixture 150 and thus, the hulls 152, to the mats 96 of the removal units 37, 38 and 39.

Preferably, the apparatus 10 is activated such that the removal units 38 and the conveyor 28 are moving prior to the nut mixture 150 being fed into the feed bin 12. Once the apparatus 10 is activated and the nut mixture 150 is deposited into the bin 12, the nut mixture 150 is then fed onto the conveyor belt 30 at the front of the apparatus 10. The conveyor 28 moves the nut mixture 150 along a horizontal plane parallel to the longitudinal axis A—A of the apparatus 10. As the nut mixture 150 moves through the apparatus 10, the mixture 150 moves consecutively beneath each of the removal units 37, 38 and 39. The removal units 38 operate similarly and therefore, only the operation of the frontmost removal unit 37 will be described in detail. As the mixture 150 moves beneath the removal unit 37, the mixture 150 is sandwiched between the conveyor belt 30 and the fibrous mat 96 on the drum 40 of the removal unit 38 (FIG. 8). The support plate 34 beneath the conveyor belt 30 prevents the conveyor belt 30 from giving way to the pressure of the drum 40. The drum 40 itself however, due to the cushion layer 48, is able to deform to accommodate the hulls 152 and meats 154 of the nut mixture 150. The flexibility of the fibrous mat 96 allows the mat 96 to deform along with the cushion layer 48. Thus, the fibrous mat 96 is able to deform around the hulls 152 and meats 154 in the nut mixture 150 as the nut mixture 150 passes beneath the drum 40 of the removal unit 37. As the fibers 96C on the outer surface 96B of the fibrous mat 96 come into contact with the projections 152A on the outside surface of the hulls 152, the projections 152A tend to become entangled within the fibers 96C of the fibrous mat 96 (FIG. 6). The curved or looped shape of the fibers 96C of the mat 96 increases the likelihood that the projections 152A on the hull 152 will engage the fibers 96C of the mat 96 and become entwined. The outer surface of the meat 154 however is smooth and thus, does not tend to become engaged by the fibers 96C of the mat 96. As the conveyor 28 continues to move forward, the drum 40 continues to rotate moving a different portion of the mat 96 into contact with the conveyor belt 30 and the nut mixture 150. As the mat 96 is rotated upward around the drum 40 and away from the conveyor belt 30, the hulls 152 which have extensions 152A entangled in the fibers 96C of the mat 96 are moved upward along with the mat 96 and away from the remaining nut mixture 150 on the conveyor belt 30. As the mat 96 is moved upward, some of the hulls 152 which are not securely entwined in the mat 96, fall back, downward toward the conveyor 28. A portion of these hulls 152 are captured by the extended lip 80C of the trough 80 of the auger 78 of the adjacent removal unit 38. The positioning of the extended lip 80C of the trough 80 of the auger 78 adjacent the drum 40 of the next adjacent unit 38 prevents some of the hulls 152 from falling back onto the conveyor belt 30. However, some of the dropped hulls 152 fail to get caught in the trough 80 and fall back onto the conveyor belt 30 to be run through the next removal unit 38. The hulls 152 securely entwined in the fibers 96C of the mat 96 continue to travel on the mat 96 around the unit 38. As the mat 96 travels past the beater 56, the beater rods 62 alternately make contact with the backing 96A of the mat 96 causing the mat 96 to vibrate violently. The beating on the backing 96A of the mat 96 causes the hulls 152 engaged on the outer surface 96B of the mat 96 to be shaken off. The hulls 152 fall away from the mat 96 down the channel between the deflector 92 and the shield 93 and into the trough 80 where the auger 78 acts to move the hulls 152 into the removal chute 86 and into the removal bin 90. After the hulls 152 have been removed from the outer surface 96B of the mat 96, the outer surface 96B of the mat 96 moves into contact with the wires 70 of the brush 64. The wires 70 lightly pluck the fibers 96C of the mat 96 in order to fluff the fibers 96C and rejuvenate the holding ability of the fibers 96C. In the preferred embodiment, all of the hulls 152 are removed by the beaters 56. In the preferred embodiment, the apparatus 10 has three (3) removal units 37, 38 and 39 such that as the nut mixture 150 moves through the apparatus 10 it is acted on by three units 37, 38 and 39 before the final nut mixture 156 falls off the conveyor 28 into the collection funnel 35 and finally into the collection bin 36.

In the preferred embodiment, the first pass of the mixture 150 through the apparatus 10 removes approximately four-fifths of the hulls 152 from the nut mixture 150. The second pass through the apparatus 10 removes approximately half of the remaining hulls 152 and the third pass through the apparatus 10 removes only a minimal number of the remaining hulls 152. Preferably, after three passes through the apparatus 10, approximately about 90% of the hulls 152 are removed from the nut mixture 150. The final nut mixture 156 exiting the apparatus 10 is preferably approximately about 50% meats 154 with the remaining 50% containing hulls 152, sticks and stones. It is also possible that some of the sticks or other waste material in the nut mixture 150 may have projections which engage the fibers 96C of the mat 96 and which are removed along with the hulls 152. The efficiency of the apparatus 10 with respect to the percentage of hulls 152 removed from the mixture 150 depends in some part on the condition of the nut mixture 150. Hulls 152 which have been extensively handled tend to have less extensions 152A and thus, are less likely to be engaged by the mat 96 and removed from the nut mixture 150. Thus, nut mixtures 150 which have been handled extensively have an increased percentage of hulls 152 in the final mixture 156. The moisture content of the nut mixture 150 also affects the effectiveness of the apparatus 10. As the hulls 152 gain moisture, they become more elastic and the extensions 152A of the hulls 152 fall down and do not readily engage the mat 96.

The effectiveness of the apparatus 10 may also be varied by adjusting the speed of the conveyor 28 and the removal units 37, 38 and 39. The apparatus 10 of the preferred embodiment passes through approximately about 600 lbs. of the nut mixture 150 in one hour. The amount of mixture 150 handled by the apparatus 10 in a certain time period or the throughput of the application may also be varied by varying the speed of the conveyor 28 and removal units 37, 38 and 39 or by varying the width of the conveyor belt 30 and the fibrous mat 96. In the preferred embodiment, the fibrous mat 96 will run approximately about eight (8) hours continuously without needing replacing. Further, the fibrous mat 96 is preferably washable which enables the mat 96 to be reusable. When the fibers 96C on the mat 96 eventually lose their ability to engage and hold onto the hulls 152, the mat 96 must be replaced.

In the second embodiment, the upper level 228A of the conveyor 228 and the first pair of removal units 237 and 238 operate similarly to the apparatus 10 of the preferred embodiment. However in the second embodiment, after the first two units 237 and 238, instead of immediately subjecting the nut mixture 150 to another removal unit 239, the nut mixture 150 is first dropped to the lower level 228B of the conveyor 228. As the nut mixture 150 is dropped, the mixture 150 is preferably re-orientated such that hulls 152 which were originally orientated with their outer surfaces adjacent the conveyor belt 30 are rotated approximately 180° such that the projections 152A on their outer surfaces are extending upward toward the fibrous mat 96. The reorientated mixture 150 is then run through the second pair of removal units 239 and 240. By re-orientating the nut mixture 150, the apparatus 10 is able to pick up more hulls 152 in the second pair of removal units 239 and 240 due to the newly exposed outer surfaces of the remaining hulls 152. There are a variety of ways which might be used to re-orientate the nut mixture 150. The second embodiment in theory should be able to remove a greater percentage of the hulls 152 than the preferred embodiment although such a theory has not been tested.

In the third embodiment, the removal units 337 and 338 are mounted adjacent each other on opposite sides of a vertical axis C—C of the apparatus 310. As the drums 340 of the removal units 337 and 338 rotate, the nut mixture 150 is gravity fed preferably from a bin 212 into the apparatus 310 between the two drums 340 of the apparatus 310. As the nut mixture 150 is moved between the drums 340, the projections 152A on the hulls 152 engage the fibrous mats 396 on either of the drums 340 and are removed from the nut mixture 150. The remaining nut mixture 156 then falls into a collection bin 336 beneath the removal units 337 and 338. The set up of this embodiment with the fibrous mats 396 on the opposed sides reduces the problems associated with the orientation of the outer surfaces of the hulls 152. Although it is still possible that a hull 152 might be incorrectly orientated, the percentage of incorrectly orientated hulls 152 is less, due to the two opposed mats 396. The removal of the hulls 152 from the mats 396 of the third embodiment is similar to that used in the preferred embodiment. Although as shown in FIG. 10, a conveyor 339 adjacent the beater 356 of the removal unit 337 may be used to convey the removed hulls 152 away from the unit 337.

In the preferred embodiment, the final nut mixture 156 is at least 20% and is preferably about 50% meats 154. The meats 154 of the final nut mixture 156 may be efficiently separated out of the final nut mixture 156 and sold as an edible product at the current market value of the particular meat. Part of the reason meats may be separated from the remaining nut mixture 150 efficiently using well known methods is that the percentage of waste products such as sticks and stones which have a different density and weight than the meats and hulls is greater due to the removal of the hulls 152. The waste products especially stones may be easily removed using conventional methods such as by gravity separation. In addition, once the hulls 152 have been separated out of the mixture 150, the hulls 152 may be sold as a source of cattle feed.

It is intended that the foregoing description be only illustrative of the present invention and that the present invention be limited only by the hereinafter appended claims.

We claim:

1. A nut sorting apparatus for the removal of at least some pieces of broken outer layers from a mixture of nut meats and pieces of the outer layers wherein in the mixture, the pieces of outer layers are separated from the nut meats and have fibrous projections extending from the pieces of the outer layers, which comprises:
    (a) support means having a surface for supporting the mixture of the pieces of outer layers and the nut meats;
    (b) removal means supporting a flexible fibrous mat wherein the surface of the support means and the fibrous mat of the removal means are movable into closely spaced relationship so that the fibrous projections on the broken pieces of the outer layers engage the fibrous mat which is movable so that the pieces of the outer layers engaged on the fibrous mat are separated from the meats which remain on the surface of the support means wherein the fibrous mat is constructed of a different material than the broken pieces; and
    (c) actuating means for moving at least one of the support means or the removal means for removal of the broken pieces of the outer layers on the fibrous mat from the nut meats on the surface of the support means.

2. The apparatus of claim 1 wherein the support means is planar and oriented in a horizontal plane and the removal means is a cylindrical drum having a horizontal axis of rotation and wherein the fibrous mat is supported on an outside cylindrical portion of the drum around the axis of rotation of the drum.

3. The apparatus of claim 2 wherein the fibrous mat is a continuous belt means which is supported on the cylindrical portion of the drum and by idler rollers spaced apart from the drum having a horizontal axis of rotation parallel to the axis of rotation of the drum.

4. The apparatus of claim 3 wherein a separation means is provided adjacent to the belt means for removing the pieces of the outer layers engaged by the belt means.

5. The apparatus of claim 4 wherein the separation means is a beater means which rotates to beat the pieces of the outer layers from engagement with the belt means.

6. The apparatus of claim 5 wherein the beater means are bars which are rotated on a horizontal axis to contact the belt means and separate the pieces of the outer layers from engagement with the belt means and into a collection means mounted adjacent the beater means.

7. The apparatus of claim 6 wherein an auger means is provided for moving the pieces of the outer layers from the collection means.

8. The apparatus of claim 7 wherein a chute means is mounted on the collection means on a side of the apparatus for collecting the pieces of the outer layers in a container means which is provided adjacent to the chute means.

9. The apparatus of claim 8 wherein a brush means is mounted adjacent to the separation means for brushing the belt means after the pieces of the outer layers are removed from engagement with the belt means.

10. The apparatus of claim 9 wherein multiple drums of the apparatus are mounted in series on a common frame and along the support means of the apparatus.

11. The apparatus of claim 10 wherein the horizontal axis of each of the drums is in a single horizontal plane.

12. The apparatus of claim 3 wherein a brush means is mounted adjacent to the belt means for brushing the belt means after the pieces of the outer layers are removed from engagement with the belt means.

13. The apparatus of claim 12 wherein a separation means is provided adjacent to the belt means for removal of the pieces of the outer layers from the belt means.

14. The apparatus of claim 13 wherein the separation means is a beater means which rotates against the belt means to remove the pieces of the outer layers from engagement with the belt means.

15. The apparatus of claim 1 wherein a feed means providing the mixture of meats and pieces of the outer layers between the support means and the removal means is mounted on the apparatus.

16. The apparatus of claim 3 wherein a feed means with an outlet for providing the mixture of meats and pieces of the outer layers between the support means and the removal means is mounted on the apparatus.

17. The apparatus of claim 16 wherein movable finger means are provided adjacent to the outlet of the feed means for uniformly distributing the mixture over the support means.

18. The apparatus of claim 17 wherein a roll means is mounted on opposed ends of the apparatus for unwinding and winding a sheet of material on a table as the support means so as to convey the mixture.

19. The apparatus of claim 1 wherein a roll means is mounted on opposed ends of the apparatus for unwinding and winding a sheet of material on a table as the support means so as to convey the mixture.

20. The apparatus of claim 1 wherein a separation means is provided adjacent the flexible fibrous mat and removes the broken pieces from the fibrous mat.

21. A nut sorting apparatus for the removal of at least some pieces of broken outer layers from a mixture of nut meats and pieces of the outer layers wherein in the mixture, the pieces of outer layers are separated from the nut meats and have fibrous projections extending from the pieces of the outer layers, which comprises.:
    (a) a planar support means orientated in a horizontal plane having a surface for supporting the mixture of the pieces of outer layers and the nut meats;
    (b) removal means including a cylindrical drum having a horizontal axis of rotation and a fibrous mat formed by a continuous belt means and supported on an outside portion of the drum around the axis of rotation of the drum and by idler rollers spaced apart from the drum and having a horizontal axis of rotation parallel to the axis of rotation of the drum wherein the surface of the support means and the fibrous mat of the removal means are movable into closely spaced relationship so that the fibrous projections on the broken pieces of the outer layers engage the fibrous mat which is movable so that the pieces of the outer layers engaged on the fibrous mat are separated from the nut means which remain on the surface of the support means;
    (c) a beater means provided adjacent to the belt means wherein the beater means rotates to beat the pieces of the outer layers from engagement with fibrous mat; and (d) actuating means for moving at least one of the support means or the removal means for removal of the broken pieces of the outer layers on the fibrous mat from the nut meats on the surface of the support means.

22. The apparatus of claim 21 wherein the beater means are bars which are rotated on a horizontal axis to contact the belt means and separate the pieces of the outer layers from engagement with the fibrous mat and into a collection means mounted adjacent the beater means.

23. The apparatus of claim 22 wherein an auger means is provided for moving the pieces of the outer layers from the collection means.

24. The apparatus of claim 23 wherein a chute means is mounted on the collection means on a side of the apparatus for collecting the pieces of the outer layers in a container means which is provided adjacent to the chute means.

25. The apparatus of claim 24 wherein a brush means is mounted adjacent to the separation means for brushing the fibrous mat after the pieces of the outer layers are removed from engagement with the fibrous mat.

26. The apparatus of claim 25 wherein multiple drums of the apparatus are mounted in series on a common frame and along the support means of the apparatus.

27. The apparatus of claim 26 wherein the horizontal axis of each of the drums is in a single horizontal plane.

28. An apparatus for the removal of at least some pieces of broken outer layers from a mixture of meats and pieces of the outer layers wherein in the mixture, the pieces of outer layers are separated from the meats and have fibrous projections extending from the pieces of the outer layers, which comprises:

(a) a planar support means orientated in a horizontal plane having a surface for supporting the mixture of the pieces of outer layers and the meats;

(b) removal means including a cylindrical drum having a horizontal axis of rotation and a fibrous mat formed by a continuous belt means and supported on an outside portion of the drum around the axis of rotation of the drum and by idler rollers spaced apart from the drum and having a horizontal axis of rotation parallel to the axis of rotation of the drum wherein the surface of the support means and the fibrous mat of the removal means are movable into closely spaced relationship so that the fibrous projections on the broken pieces of the outer layers engage the fibrous mat which is movable so that the pieces of the outer layers engaged on the fibrous mat are separated from the meats which remain on the surface of the support means;

(c) a brush means is mounted adjacent to the belt means for brushing the fibrous mat after the pieces of the outer layers are removed from engagement with the fibrous mat; and (d) actuating means for moving at least one of the support means or the removal means for removal of the broken pieces of the outer layers on the fibrous mat from the meats on the surface of the support means.

29. The apparatus of claim 28 wherein a separation means is provided adjacent to the belt means for removal of the pieces of the outer layers from the belt means.

30. The apparatus of claim 29 wherein the separation means is a beater means which rotates against the belt means to remove the pieces of the outer layers from engagement with the belt means.

* * * * *